United States Patent Office 3,220,524
Patented Nov. 30, 1965

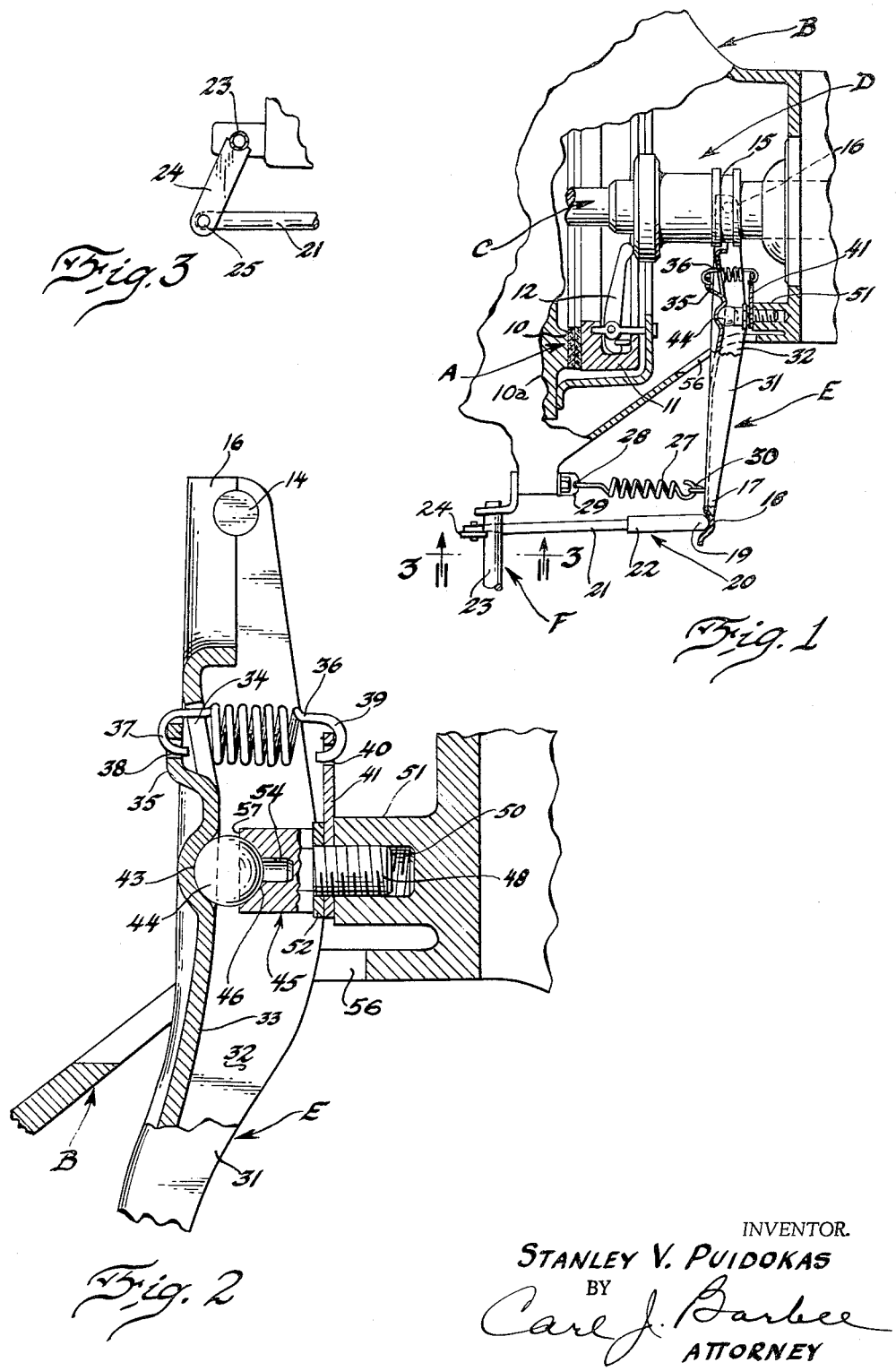

3,220,524
CLUTCH RELEASE LEVER AND
MOUNTING PIVOT
Stanley V. Puidokas, Kenosha, Wis., assignor to American Motors Corporation, Kenosha, Wis., a corporation of Maryland
Filed Mar. 6, 1964, Ser. No. 349,904
1 Claim. (Cl. 192—99)

The invention relates to a vehicle clutch and associated clutch actuating mechanism.

The invention has particular reference to the clutch release lever and associated mounting pivot.

In prior devices of this type a stationary stud with a spheroidal end portion served as the pivot about which the clutch release lever rocked, the lever having a socket formed therein into which the spheroidal end of the stud was received. There was relative movement between the socket surface and the spheroidal end of the stud each time the clutch release lever was rocked and after extended usage a galling condition developed in the lever socket or on the stud or both. Replacement of the lever and stud became necessary at intervals considered too frequent.

The instant clutch release lever and mounting pivot assures a longer wearing life due to minimizing of galling. Additional wearing life is assured because of utilization of increased bearing area in the pivotal mounting. Wearing life is also increased due to improved self-lubricating conditions. Wearing life is further increased due to relative movement of the bearing surfaces in the pivotal mounting.

The principal object of the invention, then, is to provide a clutch release lever and associated pivotal mounting which assures a longer wearing life and attendant reduction of maintenance problems.

A specific object is to employ a clutch release lever in conjunction with a movable ball pivot.

A further specific object is to provide a clutch release lever with a ball type pivot permitting greater tolerances in bearing and bearing socket sizes as compared to prior art devices.

A further specific object is to provide a clutch release lever with a ball type pivot employing improved means for assuring self-lubrication.

A further specific object is to provide a clutch release lever and ball type pivot providing substantially increased bearing surface areas due to relative movement between the ball bearing and the socket surfaces.

Other objects and advantages will be apparent from the ensuing specification and appended drawing in which:

FIGURE 1 is a fragmentary plan view of a clutch and clutch housing showing the clutch release lever and its mounting pivot partly in section.

FIGURE 2 is an enlarged fragmentary sectional view similar to FIGURE 1 and showing the components in the preferred actual size.

FIGURE 3 is a fragmentary sectional view taken on the line 3—3 of FIGURE 1.

In general I have shown a vehicle clutch A mounted in clutch housing B for selectively controlling the actuation of shaft C. A clutch release bearing assembly D is reciprocal on shaft C and the clutch release lever E actuates the release bearing assembly for effecting clutch release as desired. Conventional actuating mechanism F (only a portion of which is shown) is provided to effect actuation of the clutch release lever.

The clutch may consist of a driving member 10 which may include the flywheel 10a which is driven by the engine (not shown). The driven clutch member 11 is normally engaged with the driving clutch member and its release from such driving engagement is effected by shifting the bearing assembly D along shaft C causing the clutch fingers 12 to act against the driven clutch member 11, shifting same axially out of engagement with clutch member 10.

The clutch release lever E is provided with a bifurcated inner end, each branch of which is provided with a button 14 which is received in the annular groove 15 of the release bearing assembly. Only one branch 16 of the bifurcated end of the lever is shown.

The outer end 17 of the clutch release lever is provided with a concave socket 18 to receive the rounded nose 19 of the release lever actuating rod 20. Such rod is adjustable as to length as a result of section 21 being threaded into section 22. A suitable crank 23 has an arm 24 secured thereto, the lower end of which is pivotally connected at 25 to rod section 21. Rotation of crank 23 thus causes rectilinear movement of rod 20 to effect the swinging movement of release lever E about its mounting pivot. A return spring 27 is secured at one end 28 to a bracket 29 which is secured to the clutch housing and the other end 30 is secured to the clutch release lever. The clutch release lever is thus normally urged in a direction toward the clutch housing, when viewing FIGURE 1 wherein the clutch members are normally engaged. Actuation of the rod 20 in pushing the outer end 17 of the release lever in a direction away from the clutch housing, of course, causes releasing of the clutch members. Upon removing the actuating force which rotates crank 23 to actuate the clutch release lever, the return spring 27 actuates the release lever to effect re-engagement of the clutch members. The apparatus which may be employed to effect rotation of crank 23 is conventional and is not disclosed.

The clutch release lever may be in the form of a channel shaped stamping having opposed side walls 31 and 32 and the interconnecting wall 33. The wall 33 is slotted at 34 to permit the tab 35 to be struck therefrom. The spring 36 has one end 37 received in tab opening 38 and the other end 39 received in opening 40 in the clip 41. The lever wall 33 is provided with a concave socket 43 which receives a portion of the ball 44 and a stud 45 is provided with a concave socket 46 at its outer end which receives the diametrically opposite portion of the ball. The stud 45 has a diametrically reduced externally threaded shank 48 which is threaded into the internally threaded bore 50 in the clutch housing boss 51. The clip 41 has an opening therein through which stud 48 extends and a lock washer 52 is positioned between the clip and the annular shoulder formed on the underside of the head of the pivot stud. The spring 36 exerts continuous tension for holding the socket portion of the clutch release lever in contact with the ball 44. Thus, the spring tension serves to hold the clutch release lever against becoming dislodged from its ball pivot.

Since during engagement and disengagement of the clutch members, the clutch release lever E is subjected to rocking motion relative to the stud 45, there is necessarily a movement of the socket surface of the lever relative to the ball and/or there is movement of the ball surface relative to stud socket surface 46 as well as movement of the ball surface relative to both socket surfaces. I have found that during repeated rocking of the clutch release lever, the ball indulges in some independent moving relative to the socket surfaces about its own center and hence wearing life is prolonged due to the utilization of increased bearing area. That is, the entire outer surface area of the ball is available for functioning as a bearing, thereby increasing the total bearing area. The amount of individual movement of the ball with reference to the socket surfaces, of course, lessens the amount of relative movement between the lever socket surfaces and the ball. That is, any individual movement of the ball would involve movement of such ball relative to the stud surface as well as possible movement of the ball relative to the lever socket surface. Under some conditions, there might be considerable movement of the ball surface relative to the stud socket surface while having little or no movement of the ball surface relative to the lever socket surface and vice versa. The end result is that the tendency for a galling condition to result between the ball surface and the socket surfaces is greatly minimized.

Due to the relative movements between ball surface and socket surfaces, I have found various advantages accrue which result in lower manufacturing costs. For example, in the size of clutch release lever and ball pivot mounting assembly as shown in FIGURE 2 (such showing being substantially actual size of apparatus as may be employed with a passenger type automobile) the following dimensions and tolerances may be considered appropriate. The spheroidal surface described by the lever socket may be generated about a radius with a permitted range between .313 and .316 inch. Likewise, the spheroidal surface described by the stud socket may also be generated about a radius with a permitted range between .313 and .316 inch. These ranges are permissible when using a commercially available "⅝th" inch ball bearing. Such a bearing is manufactured by specialists in this field and is customarily held within .0002 or .0003 inch of the specified .625 inch diameter. Such a bearing is also customarily manufactured with about a two or three micro inch surface finish which permits latitude in the finishing of the socket surfaces, as will be explained more fully hereinafter.

I have found that in using a .625 inch diameter ball bearing, the lever socket surface can be generated about a radius as small as .300 inch while the stud socket surface is generated about a radius in the area between .313 and .316 inch. At any rate, the use of the foregoing described ball bearing permits latitude in the tolerance ranges of the socket surfaces which affords lower manufacturing costs.

As a result of the superb surface finish of the ball bearing, the surface finishes of the stud and lever socket surfaces can be given considerable latitude. For example, the surface finish of the stud socket can be up to a 125 micro inch finish. Thus, the stud socket surface can be machined with a conventional cutting tool without the need of any further surface finishing operation, thereby keeping manufacturing costs at a minimum. The stud can be manufactured from S.A.E. 1113 C.R. steel and there is no need for any further processing after machining. The hardness of the stud socket surface is adequate, there being no need for any heat treating process.

The lever can be fabricated in a punch press as a stamping from S.A.E. 1010 H.R.P. and O. deep drawn sheet steel and surface finish of the socket will be acceptable without need for any further manufacturing process, such as surface finishing or hardening.

The stud 45 may be provided with a bore 54 into which a lubricant is added prior to assembling the ball into the stud cavity. Any individual movement of the ball relative to the stud socket surface will activate the lubricant and cause ultimate travelling of same for adding lubricant to the lever socket. The viscosity of the lubricant can be such that the lubricant will not flow under temperature conditions up to about 110° F. Thus, during assembly, the ball bearing will tend to remain in the stud socket without need for being held while the lever is assembled in place. The clutch housing wall is provided with a suitable opening 56 to accommodate the limits of the rocking movement of the release lever. The relative movement of the ball during lever rocking causes some of the lubricant to travel along with the ball for effecting lubrication of the lever socket.

The clearance between the lever wall 33 and the end 57 of the stud is adequate to accommodate the rocking movement of the lever without encountering any contact between the lever and stud and the amount of ball surface enclosed by the lever socket and by the stud socket is considerably less than half of such ball surface, as is clearly evident when viewing FIGURE 2, while at the same time being adequate to prevent the ball becoming dislodged.

I claim:

For use in a clutch assembly including driving and driven clutch members and a housing therefor and a bearing assembly for coacting with a clutch member to effect releasing of the driving engagement between the clutch members, a lever assembly for actuating the bearing assembly, said lever assembly comprising:

(a) a release lever having its inner end coacting with the bearing assembly;
(b) said release lever being pivotally mounted relative to the clutch housing for rocking movement about such mounting and such mounting including,
   (1) a wall on the release lever with a socket formed therein having a spheroidal surface;
   (2) a stud secured relative to the clutch housing and having a socket with a spheroidal surface spaced from and directed toward the release lever socket;
   (3) a ball bearing interposed between the sockets so that a portion of its surface is engaged with the spheroidal surface of the release lever socket and another portion of its spheroidal surface is engaged with the surface of the stud socket;
   (4) said ball being adapted for movement relative to either of the socket surfaces;
   (5) the spheroidal surfaces of the release lever socket and the stud socket being generated from a radius which is dimensionally in excess of the radius of the ball bearing and the spheroidal surfaces of the release lever socket and stud socket each defining less than a semi-sphere and each semi-sphere being substantially concentric about the axis of said stud;
   (6) said stud socket having a lubricant storing bore communicating therewith and a supply of lubricant in such bore, said lubricant being of a viscosity to hold the ball bearing in the stud socket against falling out by gravity;
(c) means for holding the socket surfaces in engagement with the ball bearing and
(d) means situated exteriorly of the housing engageable with the outer end of the release lever for rocking the release lever to effect release of the driving engagement between the clutch members.

References Cited by the Examiner

UNITED STATES PATENTS

| | | | |
|---|---|---|---|
| 594,492 | 11/1897 | Skiles et al. | 308—2 |
| 1,098,023 | 5/1914 | Deister. | |
| 1,907,008 | 5/1933 | Rockwell. | |
| 1,922,645 | 8/1933 | Tower | 192—113 X |
| 2,321,513 | 6/1943 | Reed. | |
| 2,635,728 | 4/1953 | Voigt. | |

FOREIGN PATENTS

| | | |
|---|---|---|
| 539,689 | 9/1941 | Great Britain. |
| 937,720 | 9/1963 | Great Britain. |

DON A. WAITE, *Primary Examiner.*

DAVID J. WILLIAMOWSKY, *Examiner.*